(12) United States Patent
Schlienger et al.

(10) Patent No.: US 8,015,992 B2
(45) Date of Patent: Sep. 13, 2011

(54) Z VALVE (75) Inventors: Max P. Schlienger, Ukiah, CA (US); Larry D. Gibson, Redwood Valley, CA (US)

(73) Assignee: Flight Rail Corporation, Ukiah, CA (US)

( * ) Notice: Subject to any disclaimer, the term of this patent is extended or adjusted under 35 U.S.C. 154(b) by 814 days.

(21) Appl. No.: 12/106,982

(22) Filed: Apr. 21, 2008

(65) Prior Publication Data
US 2009/0261284 A1 Oct. 22, 2009

(51) Int. Cl.
*F16K 1/18* (2006.01)
(52) U.S. Cl. ............... 137/319; 137/601.08; 137/601.15
(58) Field of Classification Search ............ 137/317, 137/319, 601.01, 601.05, 601.08, 601.09, 137/601.12, 601.15; 251/129.12, 212
See application file for complete search history.

(56) References Cited

U.S. PATENT DOCUMENTS

| | | | |
|---|---|---|---|
| 3,070,345 A | 12/1962 | Knecht | |
| 4,291,861 A | 9/1981 | Faria | |
| 5,501,427 A | 3/1996 | Endo | |
| 6,012,483 A | 1/2000 | Beddies | |
| 7,281,543 B2 * | 10/2007 | Calkins et al. | 137/15.12 |
| 2006/0081296 A1 * | 4/2006 | Schwartz et al. | 137/614.11 |

* cited by examiner

*Primary Examiner* — John Rivell
*Assistant Examiner* — R. K. Arundale
(74) *Attorney, Agent, or Firm* — Kilpatrick Townsend & Stockton LLP (57) ABSTRACT

The present invention provides a valve that controls a flow of gas or solid objects through a pipe, and particularly a z-valve used in an elevated rail transportation system. The valve includes vanes hinged to a valve stem that fold into a z-shape and retract into the valve body when the valve is open. A valve cap positioned at the top of the valve stem matches the contour of the inner surface of the pipe, allowing unobstructed flow. When the valve is closed, the valve stem is elevated into the interior of the pipe and the valve cap rotates 90° to match the contour at the top, providing a seal. The vanes extend from the z-shape to completely block a cross-section of the pipe, stopping the flow. The flow may be modulated by varying the extension of the vanes to allow a portion of the flow to pass the valve.

31 Claims, 8 Drawing Sheets

Z VALVE

FIELD OF THE INVENTION

This invention relates to a valve that can be used in controlling the flow of gas or solid objects through a pipe or duct and, more particularly, to a z-valve used in an elevated rail transportation system.

BACKGROUND OF THE INVENTION

Rapid mass ground transportation systems offer many benefits over non-mass transportation means, such as automobiles, particularly in metropolitan areas experiencing severe traffic congestion and pollution problems. Mass ground transportation may also be a desirable alternative for short-range as well as long-range air travel. Although there has been a general recognition of the need for a reliable, safe rapid transportation system, utilization of rapid transit systems has been hindered by the high cost of construction and operation as well as technical difficulties in developing an efficient and versatile light rail system.

Conventional approaches have not produced a light rail transportation system that is sufficiently versatile, efficient and cost-effective to be a feasible substitute for non-mass transportation and air travel alternatives. For instance, some so-called light rail systems have rather heavy transportation modules due to the use of heavy undercarriage or a heavy power system, high traction requirements, high on-board fuel requirements, or the like. Systems that rely on traction drives tend to have difficulty with steep grades. Moreover, external elements such as severe weather conditions and contaminations can pose substantial difficulty in the operation and maintenance of light rail systems. Additionally, traction drive mechanisms employing wheels tend to be very noisy and have a great deal of wear.

U.S. Pat. Nos. 6,360,670 (the '670 patent) and 7,225,743 (the '743 patent), which were issued to one of the co-inventors of the present invention and are assigned to the assignee of the present application, incorporated herein by reference, overcome some of these difficulties and disadvantages in an efficient and cost-effective light rail transportation system. In a specific embodiment disclosed in the '670 patent, a pod assembly is placed inside a guide tube, the exterior of which preferably supports and guides the vehicle as it moves along the tube. Motion is generated by providing a pressure differential inside the tube between the upstream region and the downstream region of the pod assembly. The pressure differential can be generated by a stationary power system that produces a vacuum on the downstream region or pressurizes the upstream region or both. The speed of the pod assembly is controlled by modulating the amount of gas flow through the pod, that is, from the upstream side to the downstream side of the pod. The speed of the pod assembly is increased by reducing the amount of gas flow through the pod assembly to thereby increase the thrust on it, and is decreased by permitting a larger amount of gas to flow past the pod assembly to decrease the thrust.

The '743 patent provides an improved light rail transportation system, having reduced wear and maintenance issues compared with the earlier system, that includes a propulsion unit set on rails inside the power tube. In an embodiment of the '743 patent, the propulsion unit employs a generally horizontally oriented thrust carriage that is disposed in a horizontal mid-portion of the power tube and includes horizontal, V-grooved wheels that engage and run along the interior rails of the power tube for guidance and weight support. A generally fan-shaped thrust valve defined by a multiplicity of thrust blades arranged in an umbrella-like fashion, also sometimes referred to as a "turkey valve" because of its fan-shaped configuration, is attached to the carriage of the propulsion unit and extends in the travel direction of the unit. Such fan-shaped thrust valves are much more effective in one direction than the other, thus the interior carriage generally has two such valves, one extending in each travel direction from the carriage to provide full thrust for the propulsion unit in either direction.

The free ends of the blades of the thrust valve can be radially expanded into or out of contact with the interior surface of the power tube. When extended and in engagement with the power tube wall, the extended blades form an umbrella-shaped wall (defining concave and convex wall surfaces) across the entire diameter of the power tube. As a result, when the air pressure on the concave side of this wall is greater than on the convex side, a thrust is generated that is transmitted via the thrust carriage and a magnetic coupler to the transportation vehicle on the outside of the power tube. The propulsion unit of the '743 patent employs a remotely-controlled switching mechanism to sequentially activate and deactivate the pressure and vacuum sources as the carriage moves along the power tube.

Although the transportation systems disclosed in the '670 and '743 patents are efficient and cost-effective light rail systems, there is a need to provide a more flexible system that allows variations in flow rate along the length of the power tube and to provide a system that is structurally more stable. Neither patent discloses a mechanism for providing different pressures, which control the flow rates, in separate sections or zones of the tube. In addition, the cyclical switching of the pressure and vacuum sources stresses the system and interferes with the smooth passage of the thrust valve over the connections points where the sources are joined to the power tube.

BRIEF SUMMARY OF THE INVENTION

The present invention provides a z-valve that is coupled to a power tube, or, more generally, to a pipe, in order to provide and control a flow that is variable through different sections of the pipe. In addition, the present invention provides a valve that allows an unobstructed flow of either gas or solid objects through the pipe when the valve is open.

The z-valve of the present invention is housed in a tube, or valve body, that has a diameter approximately half the diameter of the pipe to which it is coupled. The valve accesses the pipe via a circular opening in the pipe wall, where the circular opening also has a diameter approximately half the diameter of the pipe. Components of the valve, including a valve stem and vanes, are extended into the interior of the pipe in order to block a cross-section of the pipe. When the valve is opened, these components mechanically fold into a "z-shape" in order to fit into the valve body. The folded components are then retracted into the valve body, which is generally situated below the pipe at the location of the circular opening, leaving the interior of the pipe free of any valve components.

The top portion of the valve, the valve cap, is designed with a curvature that matches the inside surface of the pipe such that it essentially replaces the section of the pipe wall where the valve is coupled, providing a smooth and completely unobstructed pipe interior. This unobstructed interior enables a vehicle or other mechanical assembly moving through the pipe to pass by the valve without interruption, which is particularly suitable for use with the thrust valve (turkey valve) as described above, because it allows the thrust valve to fully engage the sides of the pipe, as it was designed to operate, even as it transitions over the valve location.

When the valve is actuated to close off the pipe, the folded components elevate from the valve body into the interior of the pipe. As the components are elevated, they remain folded and the valve cap is rotated 90° in order to seal with the top portion of the pipe. The valve cap achieves this seal because it is convex in the direction of flow after it has been rotated, as further discussed below. The combination of the valve stem and the valve cap blocks approximately 60% of the flow through the pipe. After the folded components have been fully elevated from the valve body and the valve cap has sealed the top of the pipe, the vanes are then extended from their folded position with the valve stem in the z-shape. The vanes are shaped to fill the remaining cross-section of the pipe on either side of the valve stem, completely blocking flow through the pipe.

In one aspect of the present invention, the valve cap has a saddle shape that is concave in one direction and convex in a cross direction. This shape allows it to match the contour of the pipe in two ways, depending on the direction it is turned. First, as described above, the valve cap forms a concave shape that is coplanar and coaxial with the inner surface of the pipe where the circular opening for the valve is located. Second, when rotated 90° from that first orientation, the valve cap forms a convex shape that matches the contour of the inner surface of the pipe above the valve opening. Thus the valve cap, positioned on top of the valve stem, seals the opening between the top of the extended valve stem and the top of the pipe.

The vanes are hinged to the valve stem and their extension may be varied between the fully folded z-shape and the fully extended position in order to modulate flow through the pipe. The vanes are linked together such that they extend in opposite directions, where one vane extends in the direction of the flow and the other vane extends against the flow. This arrangement balances the pressures in the pipe when the valve is opening and closing, similar to the operation of a butterfly valve. In addition, the interior surface of the pipe may have rails protruding from the sides, as described in the '743 patent. To accommodate those rails, the vanes may be notched to seal around the rail surfaces.

The valve uses proximity or limit switches to ensure that all of the components are correctly positioned. In particular, limit switches verify that the valve cap is rotated 90° as the valve is closed to seal the top portion of the pipe and verify that the valve is rotated 90° in the other direction as the valve is opened to avoid leaving the valve cap protruding into the interior of the pipe. Limit switches are also used to determine whether the vanes are properly folded into the z-shape. This is necessary both in order to fit the folded components into the valve body when opening the valve and in order to elevate the folded components out of the valve body when closing the valve.

In another aspect of the present invention, the valve is mounted such that its entire weight is supported by a truss assembly rather than the pipe to which it is coupled. Mounting plates and hanger rods provide the truss assembly and permit adjustments of the valve's position for alignment with the pipe. The valve can accommodate pipes having a variety of cross-sectional diameters and can be controlled by drive components such as hydraulic or screw-type actuators. In a further aspect, an elastic seal is provided along all of the sealing portions of the valve, essentially all of the portions that contact the pipe, in order to minimize leakage.

BRIEF DESCRIPTION OF THE DRAWINGS

FIG. 6A shows a top view of the valve in FIG. 6B, with the crank arm and connecting rods in additional detail.

DETAILED DESCRIPTION OF THE INVENTION

Figure 1A:
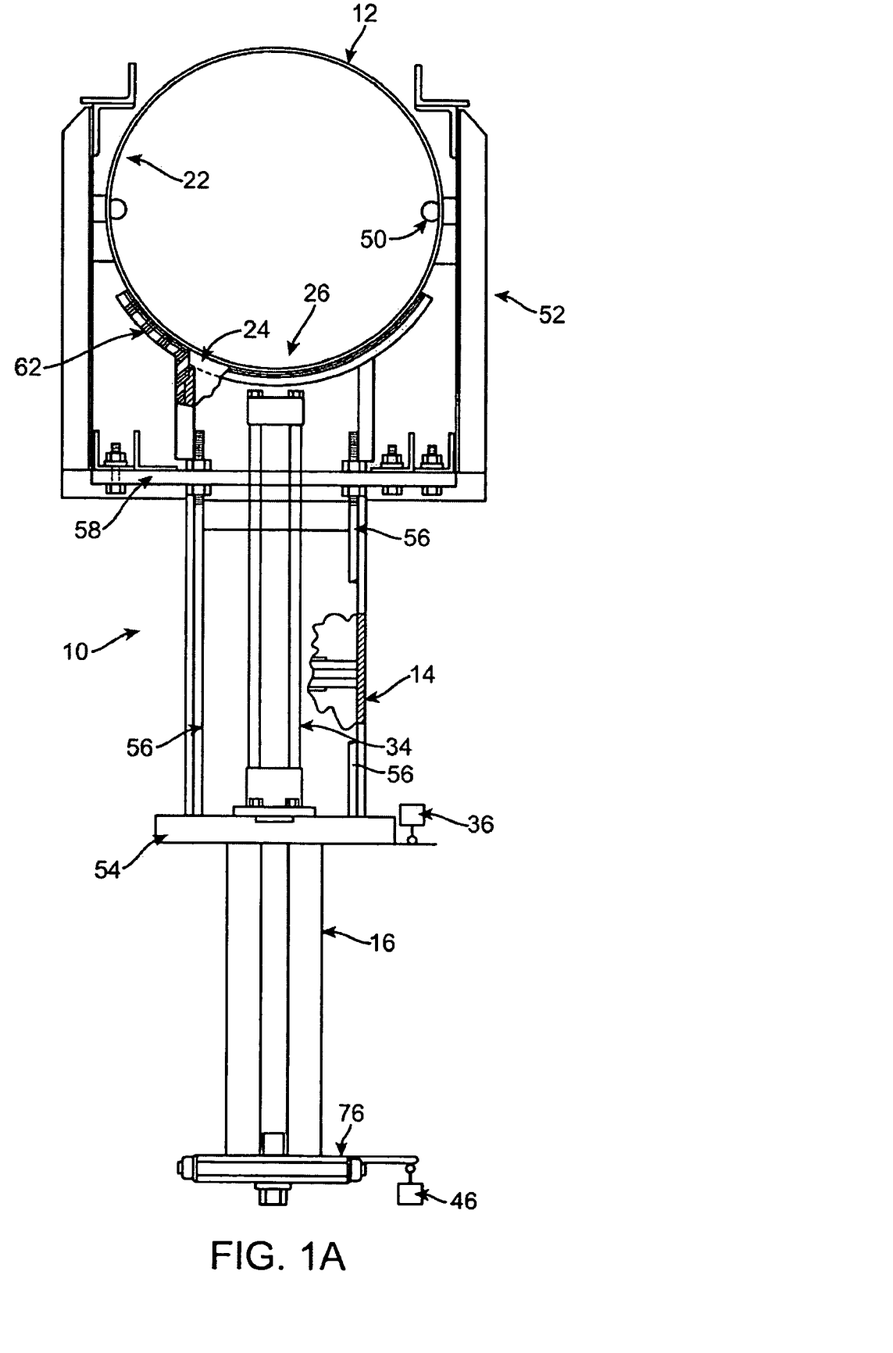
FIGS. 1A and 1B are partially cut-away side and front views, respectively, of the z-valve coupled to a pipe in an open position (1A) and a closed position (1B).
Figure 3A:
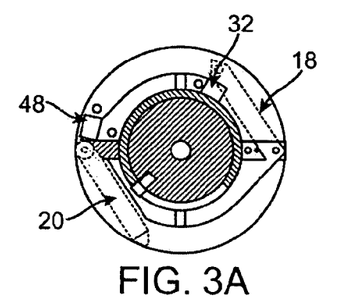
FIG. 3A is a top view of the valve stem and vanes in the folded position.

The valve 10 as shown in FIG. 1A is a z-valve that is coupled to a pipe 12 in order to control the pressure or flow in the pipe 12 by blocking or partially blocking a cross-section. The valve 10 includes a valve body 14 that is a tube with a diameter approximately one-half or less than the inside diameter D of the pipe 12. The valve body 14 is coupled to the pipe 12, as further discussed below, via a circular opening 26 in the bottom quadrant of the pipe 12. The valve 10 also includes vanes 18 and 20 that are hinged to a valve stem 16 (vanes not shown in FIG. 1A). When the valve 10 is in the open position, the valve stem 16 and vanes 18 and 20 are mechanically folded into a z-shape that fits into valve body 14. The folded components in the z-shape are shown in FIG. 3A. When the valve 10 is open, the inner surface 22 of the pipe 12 is unobstructed.

Figure 2A:
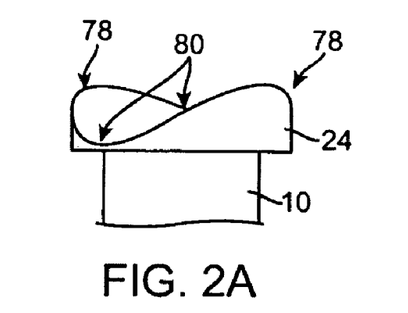
FIG. 2A shows a perspective view of the valve cap.
Figure 2B:
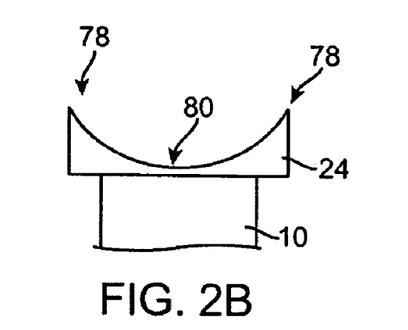
FIGS. 2B and 2C show side views of the cap from two angles that are perpendicular to each other.
Figure 2C:
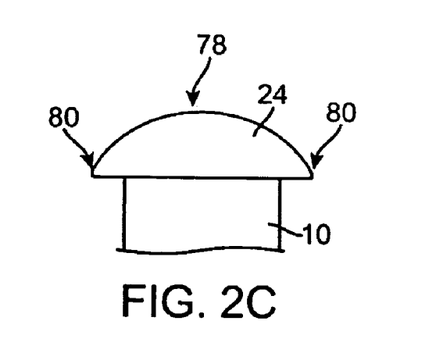
Figure 4A:
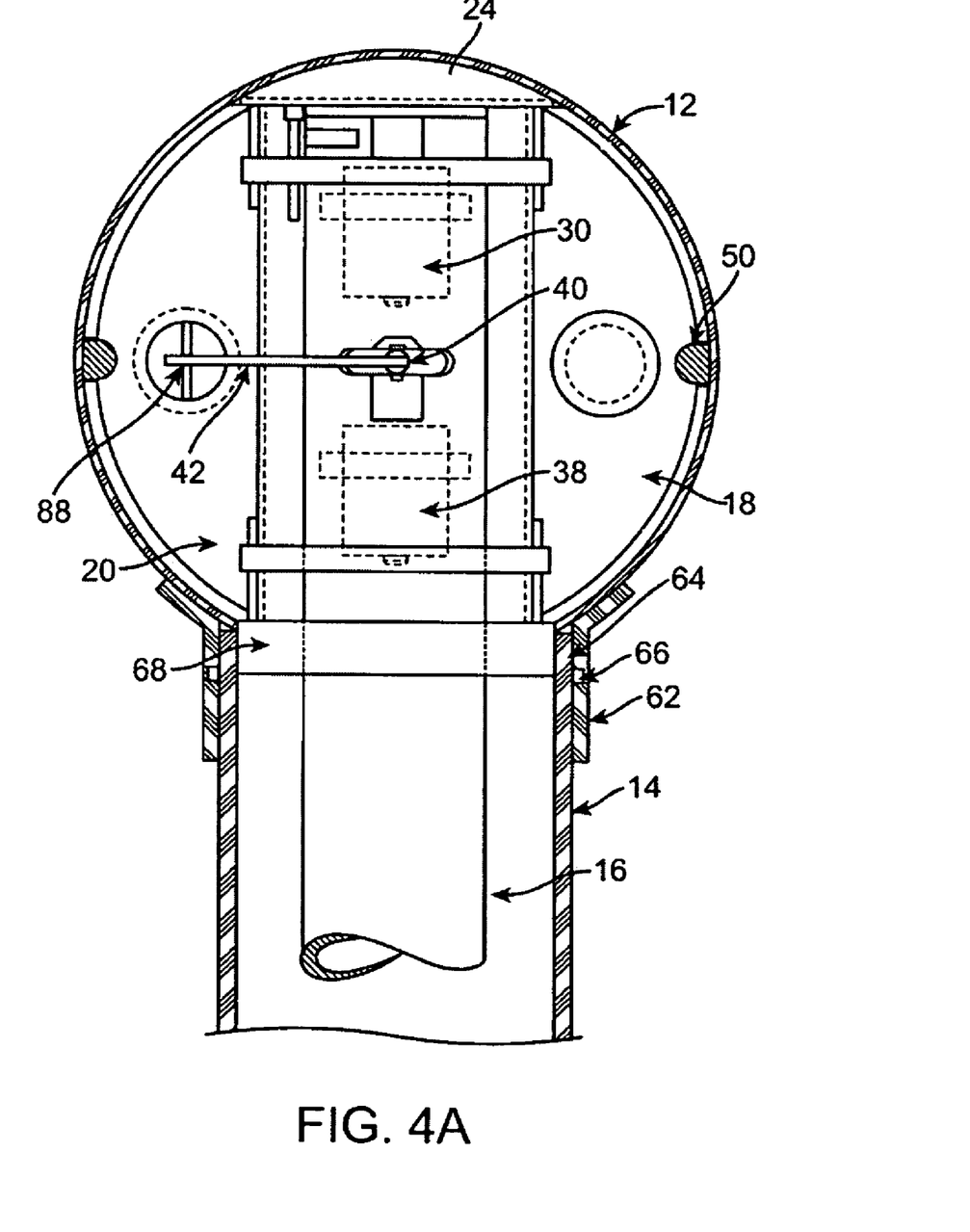
FIG. 4A is a side view of the valve in the closed position within the pipe in another embodiment.

As shown in FIGS. 1A and 4A, the top portion of the valve, above valve stem 16, is a valve cap 24. The valve cap 24 is formed in a saddle shape that matches the curvature of portions of inner surface 22 of the pipe 12. FIG. 2A shows a perspective view of valve cap 24 and FIGS. 2B and 2C show side views of the cap from two angles that are perpendicular to each other. The saddle shape of valve cap 24 is concave when viewed along its side from one direction (FIG. 2B) and convex when viewed along its side from a direction perpendicular to the first (FIG. 2C), with high points 78 and low points 80. When viewed from directly above, the valve cap 24 has a circular shape that matches the size of circular opening 26 in the pipe 12. When the valve 10 is in the open position, valve cap 24 is oriented in line and coaxial with the pipe 12, such that its concave sides are in the direction of flow through pipe 12 (i.e. a line drawn between low points 80 would be parallel to the flow). Valve cap 24 fills circular opening 26 by essentially replacing that section of the pipe wall.

With the valve stem 16 and vanes 18 and 20 folded into the z-shape and retracted into valve body 14 and with valve cap 24 filling circular opening 26, none of the valve components protrude into the interior of pipe 12 when the valve 10 is open (FIG. 1A). As a result, pipe 12 has a smooth interior surface that allows flow through the full diameter of pipe 12 to remain steady and unaffected as it passes the location of valve 10.

Generally, the valve 10 has three major positioning mechanisms that include related drive components, such as hydraulic cylinders and rotary actuators, and position sensing devices, such as limit switches, to enable sequenced opening or closing of the valve with single command logic. The three major positioning mechanisms include movement of the folded components (the valve stem 16 and vanes 18 and 20) into and out of the valve body 14, extension of the vanes 18 and 20 from the z-shape to the closed position, and rotation of the valve cap 24.

The process by which valve 10 closes off pipe 12 includes elevating the valve stem 16 through opening 26 into the center of pipe 12, sealing the top of the pipe with valve cap 24 and extending vanes 18 and 20 to seal the sides of the pipe. To execute this closing process, after the valve 10 has been actuated to close off pipe 12, a limit switch 28 (FIG. 4B) must first indicate that vanes 18 and 20 are folded into the z-shape with valve stem 16. Only when limit switch 28 indicates that the vanes 18 and 20 are in position can the valve stem 16 be elevated into the center of pipe 12. When the valve 10 is actuated to close off pipe 12 and limit switch 28 indicates that the vanes 18 and 20 are in position, limit switches 46 (FIG. 1A) and 32 (FIG. 3A) are actuated.

Figure 6A:
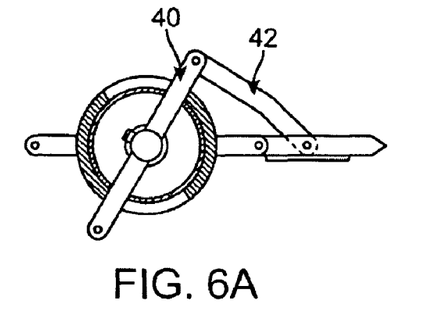
FIGS. 6A and 6B show partial views of the valve in the closed position.
Figure 6B:
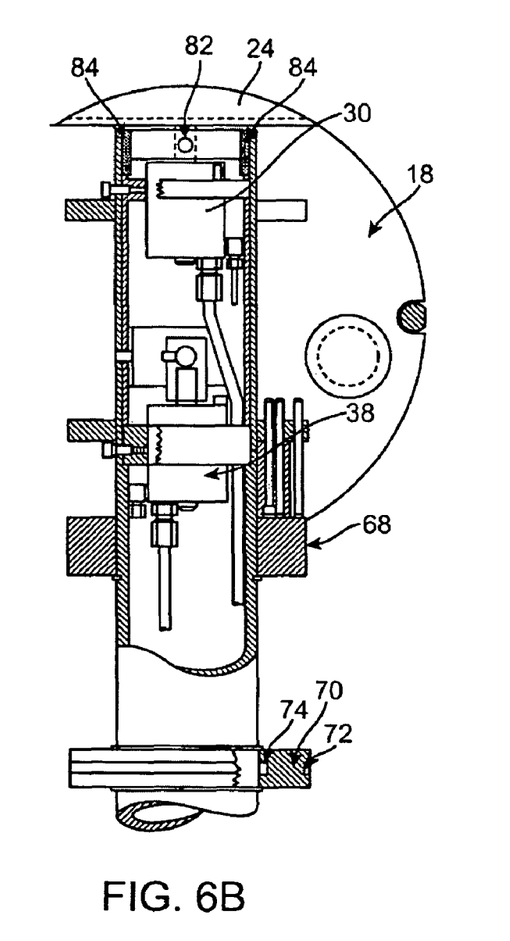

When limit switch 46 is actuated, valve cap 24 is rotated 90° about an axis extending vertically through the center of the valve 10 (the vertical axis as shown in FIG. 1A). The rotation orients the convex side of valve cap 24 in the direction of flow through the pipe 12 (i.e. a line drawn between high points 80 from FIGS. 2A-2C would be parallel to the flow), which provides the seal with the top of the pipe. It is generally simpler to complete the rotation of valve cap 24 before beginning the elevation of valve stem 16; however, it is also possible to rotate valve cap 24 while valve stem 16 is being elevated. FIG. 6B shows that valve cap 24 is coupled to a 90° rotary actuator 30 via a rotor arm 82 and a brass flange bearing 84. Thus, actuation of limit switch 46 causes rotary actuator 30 to rotate valve cap 24 by 90°. Instead of a rotary actuator, valve cap 24 may also be rotated using hydraulic cylinders (not shown). Hydraulic cylinders are particularly preferred for rotating valve cap 24 when valve 10 is installed in a pipe 12 having a large diameter due to the lower cost compared with rotary actuators suitable for a large-sized valve.

Figure 1B:
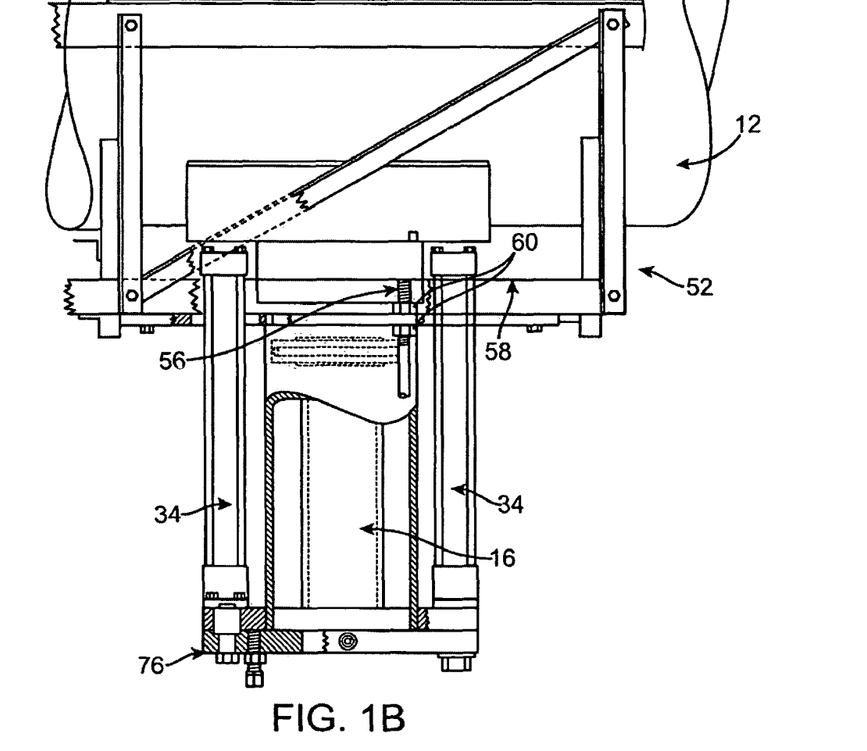
Figure 1C:
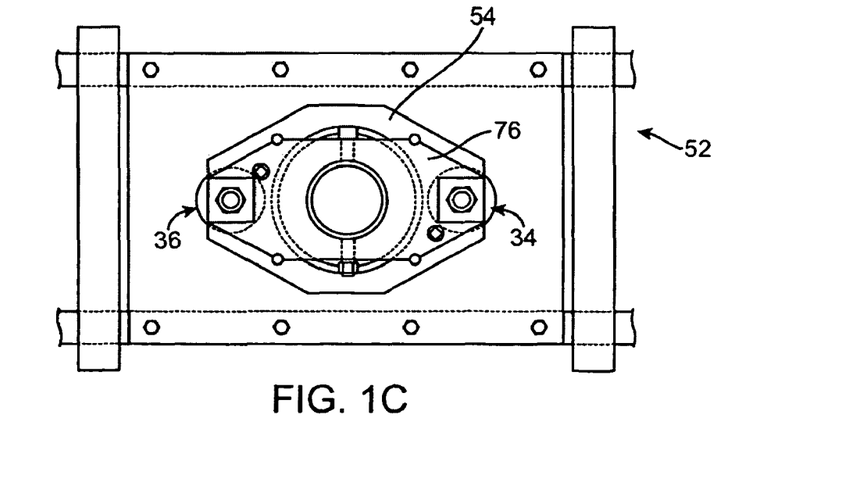
FIG. 1C is a top view of the valve showing the truss assembly and hydraulic cylinders.

When limit switch 32 is actuated, hydraulic cylinders 34 (FIG. 1A) are retracted, causing valve stem 16 to move up into the closed position, which is shown in FIG. 1B. At this point in the closing process, the valve stem 16 and valve cap 24 are in the closed position, but vanes 18 and 20 remain folded, thus only approximately 60% of the cross-section of pipe 12 is blocked by the valve 10. The valve stem 16 provides the valve 10 with a central support structure that allows the valve 10 to withstand a cantilevered pressure load without additional support at the top in the closed position. This feature of the valve is particularly advantageous for use in a power tube of a light rail system, as discussed above, as it allows a relatively thin wall thickness at the top of the power tube. A thin wall is preferred for the magnetic window through which the magnetic coupler is coupled to a transportation vehicle (as described in the '743 patent).

A limit switch 36 indicates when the valve stem 16 and valve cap 24 have reached the fully elevated position and signals the vanes 18 and 20 to extend to complete the closing of the valve 10. The vanes 18 and 20 are moved into the closed position, as shown in FIG. 4A, through the action of rotary actuator 38, which is connected to vanes 18 and 20 by crank arm 40 and connecting rods 42.

Figure 4B:
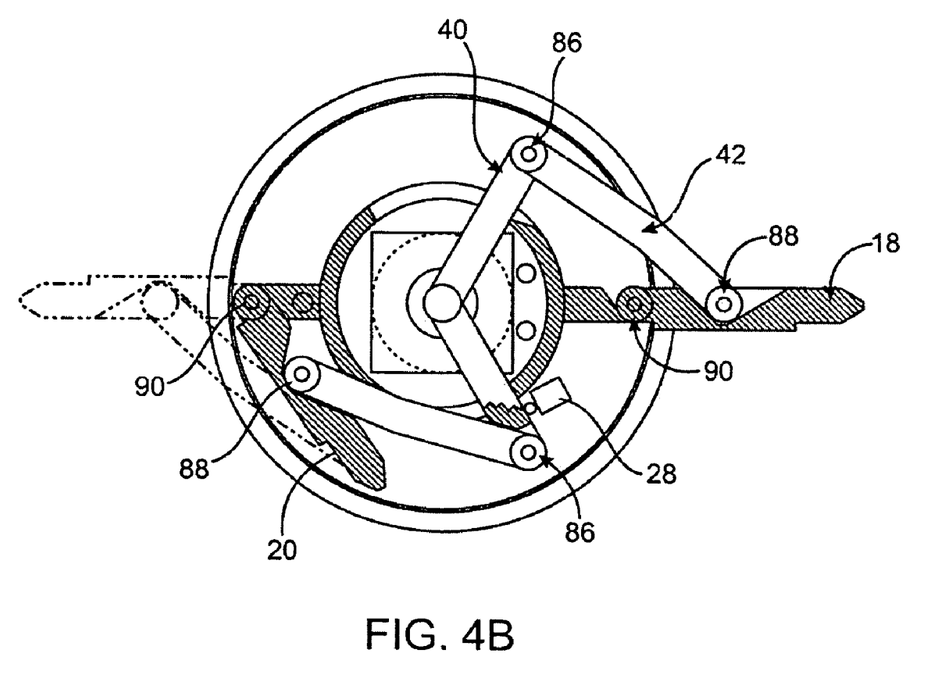
FIG. 4B is a top view of the valve stem and vanes in one embodiment.

Each end of crank arm 40 connects to a connecting rod 42 at a hinge 86. The connecting rods 42 preferably have a slightly bent shape as shown in FIG. 4B. Each connecting rod 42 is connected to one of the vanes 18 and 20 at a handle 88 (also shown in FIG. 4A). The handle 88 is formed in an indent in vanes 18 and 20, which allows the components to fold more tightly together into the z-shape. Vanes 18 and 20 are extended when crank arm 40 rotates (preferably a rotation of 60°, as shown in FIG. 6A), which causes connecting rods 42 to exert force on the vanes at the handle 88. The force in turn causes the distal ends of vanes 18 and 20 to move in an arc, with the vanes attached at their proximal ends to hinges 90 (which connect the vanes to valve stem 16), which extends the vanes to the closed position.

Although FIG. 4B shows vane 18 in the closed (extended) position and vane 20 in the open (folded) position for purposes of illustration, in practice the vanes are opened and closed together because they are both connected to crank arm 40, which causes them to move at the same time. In addition, as shown in FIGS. 3A and 4B, the linkage of vanes 18 and 20 together is such that one vane opens with the flow and one opens against the flow allowing for balanced pressures when the valve 10 is opening and closing.

Figure 5A:
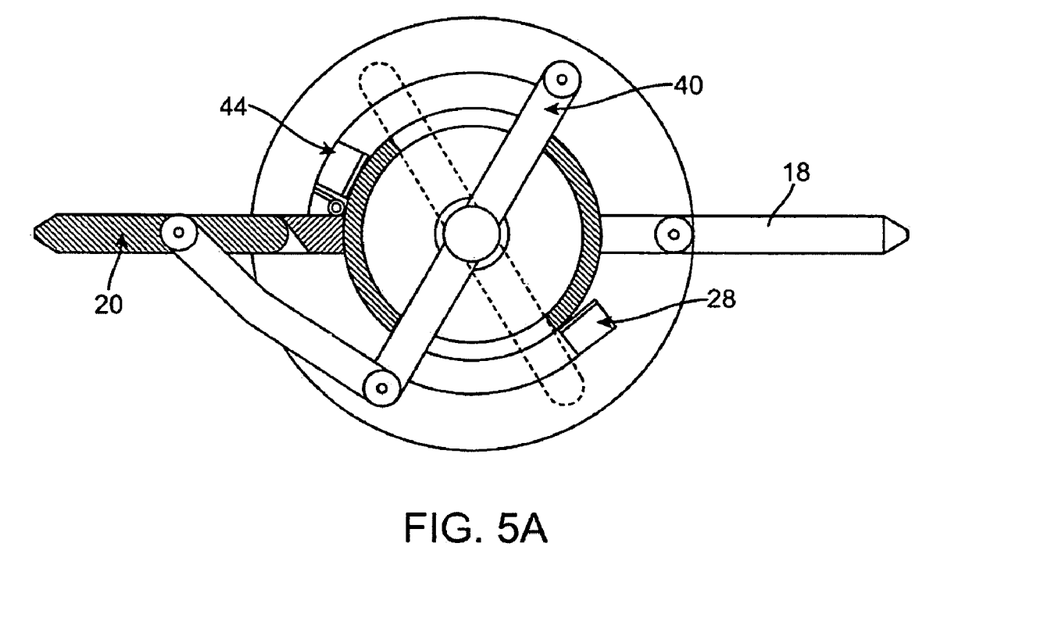
FIG. 5A is a top view of the valve stem and vanes in the extended position showing the crank arm and limit switches.
Figure 5B:
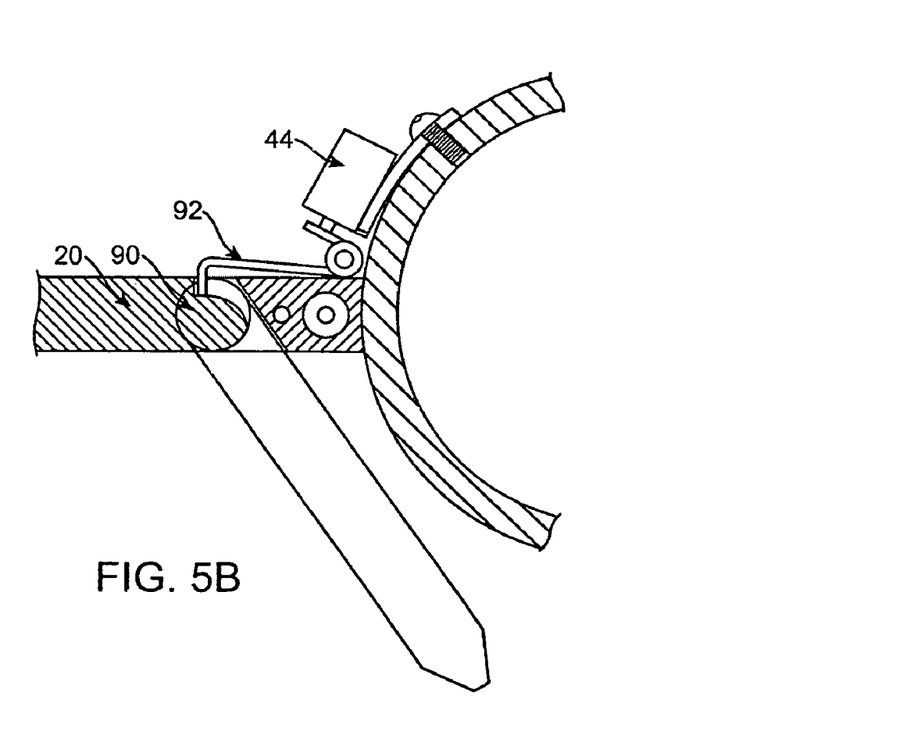
FIG. 5B is an enlarged view of a portion of FIG. 5A showing additional detail of a limit switch.

When vanes 18 and 20 are fully extended, a limit switch 44 (FIG. 5A) indicates that the valve 10 is in the closed position. As shown in more detail in FIG. 5B, when vane 20 extends straight out from hinge 90, it contacts pin 92. Pin 92 is positioned with a first end connected to hinge 90 and a second end connected to limit switch 44. Thus, when vane 20 is fully extended, it triggers limit switch 44.

In the closed position, flow through pipe 12 is blocked unless the extension of vanes 18 and 20 is varied to modulate the flow. Thus the valve 10 can be used as either a shut off valve or a throttling valve, depending on how the extension of vanes 18 and 20 is controlled.

To open valve 10 again, vanes 18 and 20 must first be folded completely into the z-shape with the valve stem 16, which is indicated by limit switch 28 as described above. Once limit switch 28 indicates that the components are properly folded, hydraulic cylinders 34 extend to the open position as shown in FIG. 1A. Extension of the hydraulic cylinders 34 causes the folded components, including valve stem 16 and vanes 18 and 20, to retract from the pipe 12. Limit switch 46 is actuated when the folded components have retracted completely into valve body 14, causing valve cap 24 to rotate 90°. The valve cap 24 is then in the orientation that is coaxial and coplanar with the bottom quadrant of pipe 12, aligned to fill the circular opening 26. When the folded components have fully retracted and valve cap 24 is aligned, limit switch 48 (FIG. 3A) is activated to indicate that valve 10 is open and gas or solid objects may travel through the pipe 12 unimpeded.

As discussed above regarding the rotation of valve cap 24 on closing the valve, it is generally simpler to rotate valve cap 24 when the valve 10 is in the completely open position (i.e. before elevation of valve stem 16 on closing and after retraction on opening). However, on opening of valve 10, it is possible to actuate limit switch 46 to rotate valve cap 24 while the folded components are retracting into valve body 14.

In an embodiment of the present invention, vanes 18 and 20 are notched in order to accommodate the rails 50 protruding from the sides of pipe 12. As discussed above, these rails 50 are utilized in conjunction with a light rail transportation system, for which the valve 10 is particularly suited. The vanes 18 and 20 can be adjusted to allow for rails or other mechanical protrusions mounted on approximately 78% of the interior walls of pipe 12. To minimize leakage through the pipe 12 when the valve 10 is closed, all of the sealing surfaces of valve 10 are equipped with a suitable elastic seal (not shown). Valve 10 is particularly useful in high flow, low pressure systems, for example those in the range of 12 psi pressure to 12 psi vacuum.

The valve 10 is coupled to the pipe 12 via a truss assembly 52, shown in FIGS. 1A and 1B. The valve body 14 is welded to a cylinder mounting plate 54, which also serves to anchor hanger rods 56. The four hanger rods 56 are attached to mounting plate 58, thus the entire weight of the valve 10 is supported by the truss assembly 52, instead of by the pipe 12. Double nuts 60 at the upper ends of the threaded hanger rods 56 permit leveling and vertical adjustment of the valve 10 into cradle 62, which is in turn fastened to pipe 12. Cradle 62 contains an O ring groove 64 and an O ring 66 (FIG. 4A) to provide a seal between valve body 14 and cradle 62. Valve 10 is securely connected to pipe 12 by the truss assembly 52 and cradle 62 such that valve 10 can be spliced directly into the pipe without adding circumferential flanges or welds. Direct splicing enables valve 10 to be added to pipe 12 with minimum down time of the system and allows nearly all of the installation to be completed without shutting down pipe 12.

Figure 3B:
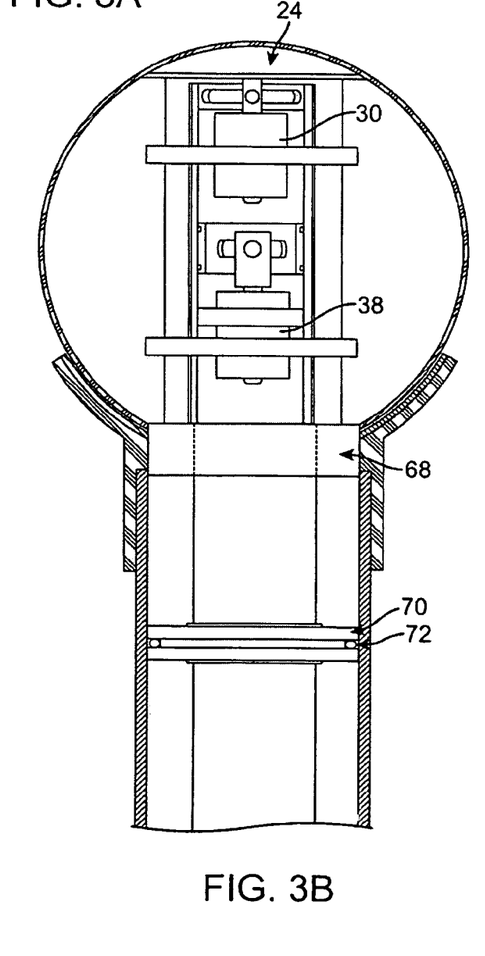
FIG. 3B is a side view of the valve in the closed position within the pipe in one embodiment.
Figure 3C:
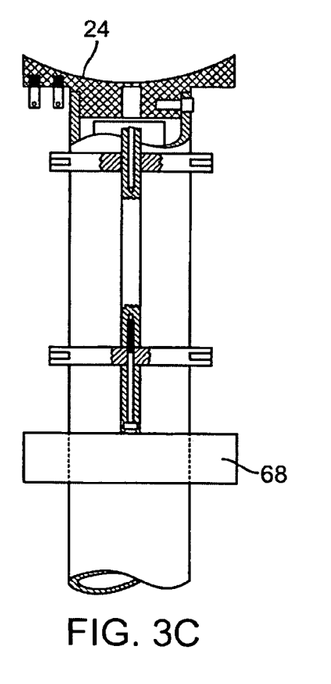
FIG. 3C is a sectional view of the valve stem and valve cap.

Valve stem 16 is guided inside valve body 14 by an upper guide 68 and a lower guide 70 (FIGS. 3B and 6B). Lower guide 70 incorporates an O ring 72 on its outside diameter and an O ring 74 on its inside diameter, as shown in FIG. 6B, to prevent any leakage into or out of pipe 12. All hydraulic lines and wiring from the switches mounted within the valve 10 and exiting from the bottom of the valve stem 16 at the valve stem yoke 76 (FIGS. 1A and 1B) are also sealed with appropriate fittings.

What is claimed is:

1. A valve for controlling a flow though a pipe having a diameter, comprising:
    a valve body positioned adjacent to the pipe, where the valve body has a diameter that is approximately one-half the diameter of the pipe;
    a valve stem engaged with the valve body;
    vanes engaged with the valve stem, the valve stem and the vanes being configured to fold into a z-shape, such that z-shape fits within the valve body when the valve is in an open position; and
    a valve cap having a saddle shape, wherein the cap is rotated 90° between the open position of the valve and a closed position of the valve.

2. A valve as described in claim 1, wherein the valve cap has a concave shape in the direction of flow when the valve is in the open position and has a convex shape in the direction of flow when the valve is in the closed position.

3. A valve as described in claim 2, wherein the concave shape is coplanar and coaxial with an inner surface of the pipe, allowing an unobstructed flow when the valve is in the open position.

4. A valve as described in claim 2, wherein the convex shape is coplanar and coaxial with an inner surface of the pipe.

5. A valve as described in claim 1, where the valve stem is positioned within the valve body and extends from the valve body by a distance that is approximately the diameter of the pipe.

6. A valve as described in claim 1, wherein the vanes extend when the valve is in the closed position such that the valve stem and the vanes obstruct flow by blocking a cross-section of the pipe.

7. A valve as described in claim 6, wherein the valve stem and the vanes form a shape that matches the cross-section of the pipe such that flow is completely obstructed.

8. A valve as described in claim 6, wherein the vanes are partially extended such that only a portion of flow through the pipe is obstructed.

9. A valve as described in claim 8, wherein the extension of the vanes is varied such that flow through the pipe is modulated.

10. A valve as described in claim 6, wherein the vanes are linked together such that they extend in opposite directions.

11. A valve as described in claim 1, wherein the vanes are hinged to the valve stem.

12. A valve as described in claim 1, wherein the vanes further comprise notches that are adapted to engage rails situated on an inner surface of the pipe.

13. A valve as described in claim 1, further comprising at least one limit switch adapted to indicate that the valve stem and vanes are folded into the z-shape.

14. A valve as described in claim 1, further comprising at least one limit switch adapted to indicate an orientation of the valve cap.

15. A valve as described in claim 1, further comprising at least one limit switch adapted to indicate that the valve is in a closed position.

16. A valve as described in claim 1, further comprising at least one limit switch adapted to indicate that the valve is in an open position.

17. A valve as described in claim 1, further comprising a truss assembly having mounting plates and hanger rods, wherein the valve is supported entirely by said truss assembly.

18. A valve as described in claim 17, further comprising double nuts coupled to the hanger rods, allowing vertical adjustment of the valve.

19. A valve as described in claim 1, wherein the flow through the pipe comprises a gas.

20. A valve as described in claim 1, wherein the flow through the pipe comprises solid objects.

21. A valve as described in claim 1, further comprising an elastic seal positioned along portions of the valve that are adapted to contact the pipe.

22. A valve for controlling a flow though a pipe having a diameter, comprising:
    a valve body positioned adjacent to the pipe, where the valve body has a diameter that is approximately one-half the diameter of the pipe;
    a valve stem engaged with the valve body;
    vanes engaged with the valve stem;
    a drive component coupled to the vanes by a crank arm and connecting rods, wherein the drive component moves the crank arm and connecting rods to fold the valve stem and the vanes into a z-shape, such that z-shape fits within the valve body when the valve is in an open position; and
    a valve cap having a saddle shape, wherein the cap is rotated 90° between the open position of the valve and a closed position of the valve.

23. A valve as described in claim 22, wherein the drive component comprises a rotary actuator.

24. A valve as described in claim 22, wherein the drive component comprises hydraulic cylinders.

25. A valve for controlling a flow though a pipe having a diameter, comprising:
    a valve body positioned adjacent to the pipe, where the valve body has a diameter that is approximately one-half the diameter of the pipe;
    a valve stem engaged with the valve body;

vanes engaged with the valve stem, wherein the valve stem and the vanes fold into a z-shape, such that z-shape fits within the valve body when the valve is in an open position;

a valve cap having a saddle shape; and a drive component coupled to the valve cap by a rotor arm and a flange bearing, wherein the drive component rotates the valve cap 90° between the open position of the valve and a closed position of the valve.

26. A valve as described in claim 25, wherein the drive component is coupled to a limit switch that actuates the drive component.

27. A method for controlling a flow through a pipe, comprising:

providing a valve having a valve body positioned adjacent to the pipe, a valve stem engaged with the valve body, vanes engaged with the valve stem, and a valve cap having a saddle shape; and regulating the flow through the pipe by opening and closing the valve, wherein the valve is opened by actuating a crank arm to fold the vanes into a z-shape with the valve stem, retracting the folded valve stem and vanes into the valve body and rotating the valve cap 90° to align with an inner surface of the pipe, such that the valve cap is coplanar and coaxial with an inner surface of the pipe and flow through the pipe is unimpeded, and wherein the valve is closed by elevating the folded valve stem and vanes out of the valve body, rotating the valve cap 90° to align with a top portion of the pipe, and extending the vanes to block a cross-section of the pipe such that flow through the pipe is stopped.

28. A method for controlling a flow through a pipe as described in claim 27, wherein the flow is modulated by varying the extension of the vanes to partially block a cross-section of the pipe.

29. A method for controlling a flow through a pipe, comprising:

providing a valve having a valve body positioned adjacent to the pipe, a valve stem engaged with the valve body, vanes engaged with the valve stem, and a valve cap having a saddle shape; and regulating the flow through the pipe by opening and closing the valve, wherein the valve is opened by:

actuating a first drive component to rotate a crank arm to move connecting rods coupled to the vanes, folding the vanes into a z-shape with the valve stem, actuating a first limit switch to retract hydraulic cylinders coupled to the folded valve stem and vanes, retracting the folded valve stem and vanes into the valve body, actuating a second limit switch to engage a second drive component, and rotating the valve cap 90° to align with an inner surface of the pipe, such that the valve cap is coplanar and coaxial with an inner surface of the pipe and flow through the pipe is unimpeded; and wherein the valve is closed by:

actuating the second limit switch to engage the second drive component, rotating the valve cap 90° to align with a top portion of the pipe, actuating the first limit switch to extend the hydraulic cylinders, elevating the folded valve stem and vanes out of the valve body, actuating the first drive component to rotate the crank arm to move the connecting rods coupled to the vanes, and extending the vanes to block a cross-section of the pipe such that flow through the pipe is stopped.

30. A method for controlling a flow through a pipe as described in claim 29, wherein the first and second drive components are rotary actuators.

31. A method for controlling a flow through a pipe as described in claim 29, wherein the first and second drive components are hydraulic cylinders.

* * * * *